(12) United States Patent
Perez Cortes et al.

(10) Patent No.: US 8,811,722 B2
(45) Date of Patent: Aug. 19, 2014

(54) DEVICE AND METHOD FOR ACQUISITION AND RECONSTRUCTION OF OBJECTS

(75) Inventors: Juan Carlos Perez Cortes, Valencia (ES); Sergio Sáez Barona, Valencia (ES)

(73) Assignee: Instituto Technológico de Informática, Valencia (ES)

( * ) Notice: Subject to any disclaimer, the term of this patent is extended or adjusted under 35 U.S.C. 154(b) by 228 days.

(21) Appl. No.: 13/515,275

(22) PCT Filed: Dec. 10, 2009

(86) PCT No.: PCT/ES2009/070571
§ 371 (c)(1),
(2), (4) Date: Sep. 25, 2012

(87) PCT Pub. No.: WO2011/070181
PCT Pub. Date: Jun. 16, 2011

(65) Prior Publication Data
US 2013/0202195 A1     Aug. 8, 2013

(51) Int. Cl.
*G06T 15/08* (2011.01)
(52) U.S. Cl.
USPC ............ 382/154; 600/111; 600/409; 600/117
(58) Field of Classification Search
CPC ............... G06T 7/0075; G06T 2207/10012; G06T 7/0022; H04N 13/0239; H04N 2013/0081
USPC ............................ 382/154; 600/111, 409, 117
See application file for complete search history.

(56) References Cited

U.S. PATENT DOCUMENTS

| 2012/0041297 | A1* | 2/2012 | McGary | 600/409 |
| 2012/0316392 | A1* | 12/2012 | Itoua | 600/111 |

FOREIGN PATENT DOCUMENTS

| DE | 3919865 A1 | 12/1990 |
| EP | 2053350 A1 | 4/2009 |
| WO | 2005022076 A2 | 3/2005 |

OTHER PUBLICATIONS

International Search Report, Jul. 5, 2010.

\* cited by examiner

*Primary Examiner* — Ruiping Li
(74) *Attorney, Agent, or Firm* — Tristan A. Fuierer; Moore & Van Allen, PLLC

(57) ABSTRACT

The purpose of this invention is a device and a method which will permit the acquisition and subsequent reconstruction of objects with volume throughout the total external surface. This invention is characterised in that it has a particular mode of acquisition on the free fall object in such a way that there is no support surface which prevents acquisition of the surface which would be hidden by said support. The invention is also characterised by special modes of distribution of the cameras which optimise image capturing and provide useful information in the subsequent reconstruction of the volume through computer means.

8 Claims, 1 Drawing Sheet

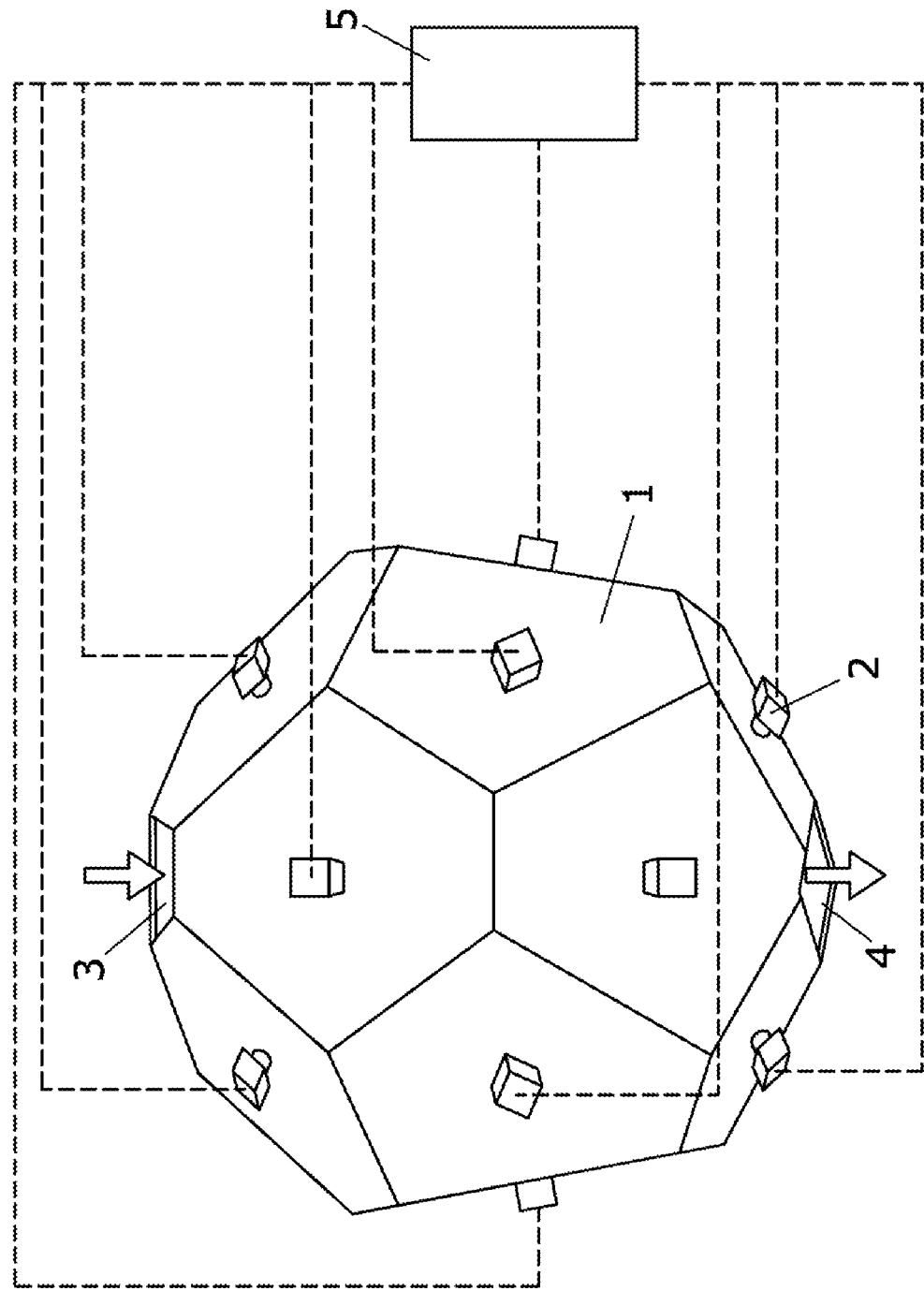

US 8,811,722 B2

DEVICE AND METHOD FOR ACQUISITION AND RECONSTRUCTION OF OBJECTS

CROSS-REFERENCE TO RELATED APPLICATIONS

This application is filed under the provisions of 35 U.S.C. §371 and claims the priority of International Patent Application No. PCT/ES2009/070571 filed on 10 Dec. 2009 entitled "Device and Method for Acquisition and Reconstruction of Objects" in the name of Juan Carlos PEREZ CORTES, et al., which is hereby incorporated by reference herein in its entirety.

OBJECT OF THE INVENTION

The purpose of this invention is a device and a method which will permit the acquisition and subsequent reconstruction of objects with volume throughout their total external surface. This invention is characterised in that it has a particular mode of acquisition on the object in free fall in such a way that there is no support surface which would prevent acquisition of the surface by hiding it.

It is also characterised by special modes of distribution of the cameras which optimise the capture of images and provide useful information on the subsequent reconstruction of volume through computerised means.

BACKGROUND TO THE INVENTION

The acquisition of data on objects with volume which permits their subsequent reconstruction with computerised means is an active line of research due to its interest and multiple applications.

The acquisition and reconstruction of three dimensional images is a task which has been widely addressed in the field of "computer viewing". The methodologies employed are diverse, such as, for example, those based on structured light or multi-vista stereoscopy, which included those known as "Shape from Silohuettes" or "Shape from Voxel Occupancy" and those based on "Shape from Photo-Consistency". The first have as a limit the reconstruction of "visual hull" of the objects analysed and the second can go further, however, they depend on the existence of characteristic points discernible in the objects.

With respect to the application for which the invention is designed, the control and inspection of objects in order to verify their three dimensional form and their volumetric measures, as well as the image of their surface, is an important area within the scope of "Industrial Vision".

Almost all the existing applications and solutions are based on reconstruction of part of the object to be inspected and not the whole, as this is usually rested on a conveyor belt which only permits one face thereof to be viewed. In this case, the movement of the object in front of a camera and the use of structured light (typically a laser light line) permit a longitudinal sweep of the same, thus obtaining a series of height profiles which will provide reconstruction of the object. We could call this reconstruction "20 and ½", in order to distinguish it from the full 3D reconstruction of the whole object which is provided in this invention.

DESCRIPTION OF THE INVENTION

This invention consists of a device for the acquisition and reconstruction of objects with volume. This device is provided with:

a group of image capturing sensors for acquisition of the object with volume under analysis.

These sensors are those which obtain images of the object from various points providing information on the form of the object seen from its location;

computer equipment for reconstruction of the full volume and surface of the object based on the images required by means of image capturing sensors.

Algorithms and means of reconstruction of the object through images obtained by image capturing sensors may be any of the kinds known in the art, as the technical problem to be resolved by the invention is resolved by the mode of arranging the cameras and the object in the space so that the object is accessible throughout its external outline;

In addition, it is provided with a surface on which image capturing sensors are distributed, where this surface limits a volume in its interior destined to receive the object under analysis and where the sensors are oriented with their optical axes towards the interior volume of the surface; with this surface being additionally provided with an entry aperture and an outlet aperture such that they permit the passage, through the interior of the surface of the object under analysis in a free fall movement.

The surface along which the image capturing sensors are distributed is no necessarily a closed surface and it may also be defined by means of discrete points which define the situation in space of the image capturing sensors; and these are connected structurally solely by means of rods or other light elements.

The most important achievement is that the sensors establish an interior volume through which it is possible for the object under analysis to be passed. The passage is carried out through free fall of the object following the entrance in the volume through the entry aperture; and when it has passed through the interior of the volume, the object exits through the outlet aperture.

The entry and outlet apertures may be the same it is sufficient that the object should be, for example shot towards the inside of the volume and that subsequently in its fall it exits once more through the same aperture, as described in claim 7.

It is the passage through the volume interior which permits the object to show it entire external surface in order to be visually accessible and to be identifiable.

The system is designed to obtain a three dimensional reconstruction of an object in the air, in free fall or another trajectory facilitated by mechanical action thereon, through an open space in the interior of the device specifically designed for this purpose.

The presence of the object triggers the simultaneous capture of a certain number of images from a group of cameras or image sensors situated in an arrangement optimised for subsequent reconstruction of the object volume. The object may cross the capture space abandoned in free fall from above by a conveyor belt or driven or situated in the same through a mechanical, electrical, pneumatic etc actuator, from any initial position in such a way that at the moment of triggering the object is visible from all possible angles without any element in contact interrupting its visibility. This mode of action determines a procedure for the acquisition and reconstruction of objects with volume in accordance with claim 9, which is incorporated by reference in this description.

The various modes of embodiment of the invention in accordance with dependent claims 2 to 8 are also considered to be incorporated by reference and which resolve additional technical problems, the solutions to which are described in the detailed explanation of the invention.

DESCRIPTION OF THE DRAWINGS

The present descriptive report is complemented by a set of plans illustrating a preferred embodiment of the invention, but which is in no way restrictive.

FIG. 1 shows a perspective view of a device according to a mode of embodiment of the invention in which a mode is shown for configuring a surface with entry and outlet apertures of the object under analysis as well as the arrangement of the image capturing sensors.

DETAILED EXPLANATION OF THE INVENTION

In the description of the invention the essential elements of said invention have been carried out, in particular as shown in an example of an embodiment as shown in FIG. 1.

We shall firstly analyse theoretical aspects and subsequently we shall describe the practical mode of carrying out the device, making use of said theoretical aspects.

An adequate geometry for establishing configuration of the surface on which the image capturing sensors (2) are distributed in the device of the example of an embodiment, is a sphere with centre in one point. The image capturing sensors (2) shall be uniformly distributed on the surface of the sphere in accordance with a standard criterion such as for example, that which establishes that the potential energy of a hypothetical system composed of particles with electric charge distributed on the points of the surface is minimum. According to this model, the points are calculated by minimisation of the functional:

Other criteria may be applied, not necessarily making use of the Euclidean distance.

The minimisation of the criterion proposed is simple and may be made by simulation and using descending algorithm or more efficient means may be used such as that of the conjugated gradient or GMRES ("Generalized Minimal Residual Method").

Having defined the points, in each of these an imaging camera or sensor (2) is situated in such a way that its optical axis is a radius of a sphere and points towards the centre thereof. It is not necessary to situate a camera in all the points obtained in the calculation giving rise to the distribution of points. The number of image capturing sensors (2) may be less than the number of points to be distributed according to the criterion chosen.

An additional important restriction is the fact that the points are not diametrically opposed two by two, as the silhouettes obtained provide very little information (they are the same except. for the effect of the transformation due to perspective).

For example, it is possible to establish a distribution of image capturing sensors (2) in such a way that two image capturing sensors (2) do not face their focal axes contained in the same straight line.

Another additional restriction according to another embodiment establishes that none of the image capturing sensors (2) has another image capturing sensor (2) in its angle of vision that is, that the free area visible to each image capturing sensor (2) is maximum. In order to achieve this, various values may be explored and a configuration chosen which fulfils the restrictions (this is the case seen in FIG. 1), or the methodology proposed may be slightly amended, linking to each load another identical one which is diametrically opposed and applying the same minimization procedure. Subsequently one of the loads of each par will be dispensed with.

An equivalent geometry which is more appropriate in some cases from a mechanical and constructive point of view, is a hollow polyhedron with faces as shown in the figure of an example of an embodiment. In this case the polyhedron should comply with the following requirements:

each of the faces (1) of the polyhedron is provided with an image capturing sensor (2); and, furthermore the same face (1) verifies that the there is a spatial arrangement such that the principal plane which defines the surface of the face is tangential to the sphere which establishes the geometrical location on which the image capturing sensor (2) associated with said face (1)is situated; and none of the faces (1) is parallel to the other(1).

As a result of these criteria, the following is necessary:

1. The polyhedron contains inscribed therein the sphere used in calculating the distribution of the image capturing sensors (2).

2. Each face (2) of the polyhedron intersects the inscribed sphere at one of the points where the image capturing sensor (2} is found. The straight line which passes through the centre and crosses the point where the image capturing sensor (2) is located is perpendicular to the plane of the face on which said sensor (2) is situated.

3. At each point where the image capturing sensor (2) is located, this (2) is situated in such a way that its optical axis is exactly the straight line that passes through the centre of the sphere.

4. The polyhedron has not parallel faces (1) in accordance with the previously proposed restrictions.

5. The polyhedron has at least two vertexes such that the centre of the sphere and the two vertexes belong to a same straight line or axis.

The number of faces (1) should, as has been mentioned, be sufficient for the task and at the same time moderated in order to avoid incurring excessive material costs. There is at least one polyhedron with 16 faces (1) which fulfils all the criteria described. This is shown in FIG. 1.

It is possible to observe faces (1) of this polyhedron closing a volume and with each of the faces (1) containing an image capturing sensor (2). It should again be clarified that the surface which establishes the distribution of the sensors (2) is not the surface used in calculating the distribution in the space of the image sensors (2).

The truncation of two points of the polyhedron permits the arrangement of two apertures, the entry aperture (3) and the outlet aperture (4).

FIG. 1 shows a diagram connection of each of the cameras with a calculation unit (5) which constitutes the computer equipment for the reconstruction of the volume based on images acquired by means of image capturing sensors (2).

Similarly, although they are not represented in the figure, there are means which permit the object under analysis to fall through the entry aperture (3), pass through the interior of the device for capturing images which give rise it their form; and exit through the outlet aperture (4). The entry and outlet directions are indicated in this example of an embodiment by means of arrows.

It should be indicated that the device in the example of an embodiment is provided with a sensor (2) which is not shown in the figure, that determines the simultaneous trigger moment of the image capturing sensors (2) for subsequent processing when the object under analysis is located in a specific region of the interior volume of the surface.

The arrangement of sensors may capture the image, in visible light or any wavelength, from the longest in the infrared spectrum to the shortest in the x ray spectrum including frontal, lateral, back illumination either structured, or of any other type.

The invention claimed is:

1. A device for acquisition and reconstruction of objects with volume, the device being provided with:
   a group of image capturing sensors for the acquisition of images of the object with volume to be analyzed and adapted to capture simultaneously an image of the object;
   computer equipment(S) for reconstruction of the full volume and surface of the object based on the images required by means of the image capturing sensors;
   wherein the device is provided with a surface on which the image capturing sensors are distributed in space in such a way that they are situated in a spherical geometric location and with their optical axes essentially oriented towards the center of the sphere, wherein the surface limits a volume in its interior destined to receive the object for analysis and the sensors are oriented with their optical axes towards the interior volume of the surface; and wherein the surface is additionally provided with an entry aperture and an outlet aperture such that they constitute a passage that allows the object to pass through in a free fall movement.

2. The device according to claim 1 wherein the spatial distribution of each of the image capturing sensors in the geometric sphere coincides with any or all the points, greater or equal to, which reduce a functional.

3. The device according to claim 2 wherein the number of image capturing sensors and their distribution is such that two sensors facing each other with their focal axes contained in the same line do not exist.

4. The device according to claim 2 wherein none of the image capturing sensors has another sensor in its angle of vision.

5. The device according to claim 1 wherein the surface is polyhedric with faces such that:
   each of the faces of the polyhedron is provided with an image capturing sensor; and,
   furthermore the same face verifies that the there is a spatial arrangement such that the principal plane which defines the surface of the face is tangential to the sphere which establishes the geometrical location on which the image capturing sensor associated with said face is situated; and
   none of the faces are parallel to the other.

6. The device according to claim 1 wherein the device is provided with a sensor which determines the simultaneous trigger moment of the image capturing sensors for its subsequent processing when the object under analysis is located in a specific region of the volume interior to the surface.

7. The device according to claim 1 wherein the entry apertures coincide with the outlet aperture.

8. A process for the acquisition and reconstruction of objects with volume, said process comprising:
   causing the object to be analyzed to fall in such a way that it enters through the entry aperture of the device of claim 1, crosses the interior of the surface where the image capturing sensors are located and exits through the outlet aperture; and,
   triggering of the image capturing sensors to generate images which are sent to the computer equipment for the reconstruction of the volume and complete surface of the object based on said images.

* * * * *